United States Patent [19]
Eckard

[11] Patent Number: 5,271,178
[45] Date of Patent: Dec. 21, 1993

[54] INSECT REMOVAL AND DISPOSAL DEVICE

[76] Inventor: Kelly Eckard, 5721 Casa Loma Av., Yorba Linda, Calif. 92686

[21] Appl. No.: 782,677

[22] Filed: Oct. 25, 1991

Related U.S. Application Data

[63] Continuation of Ser. No. 551,802, Jul. 12, 1990, abandoned.

[51] Int. Cl.$^5$ .............................................. A01M 3/00
[52] U.S. Cl. ........................................ 43/110; 43/134; 220/345; 294/1.1; 294/55
[58] Field of Search ................. 294/1.1, 1.3, 26.5, 294/55; 15/257.1, 257.3, 257.6; 43/107, 110, 120, 121, 133, 134, 135; 220/345, 351; 229/9, 19

[56] References Cited

U.S. PATENT DOCUMENTS

| | | | |
|---|---|---|---|
| 576,073 | 1/1897 | Mason | 15/257.6 |
| 1,239,307 | 9/1917 | Schmid | 220/345 |
| 2,160,436 | 5/1939 | Jones | 220/345 X |
| 2,562,248 | 7/1951 | Weed | 220/345 |
| 2,975,889 | 3/1961 | Brown | 220/345 X |
| 3,494,067 | 2/1970 | Potrzuski | 43/134 |
| 3,713,245 | 1/1973 | Hovey | 43/110 |
| 4,272,906 | 6/1981 | Liebling | 43/134 X |
| 4,529,236 | 7/1985 | Vogt | 294/1.3 |
| 4,599,823 | 7/1986 | Lee | 43/134 |
| 4,830,419 | 5/1989 | Watanabe | 294/1.3 |
| 4,865,371 | 9/1989 | Egberg | 294/1.3 |

FOREIGN PATENT DOCUMENTS

| | | | |
|---|---|---|---|
| 2830983 | 1/1980 | Fed. Rep. of Germany | 294/1.3 |
| 8702192 | 4/1989 | Netherlands | 294/1.3 |
| 449338 | 6/1936 | United Kingdom | 220/351 |
| 531387 | 1/1941 | United Kingdom | 294/55 |

*Primary Examiner*—Johnny D. Cherry
*Attorney, Agent, or Firm*—A. Ray Osburn

[57] ABSTRACT

An insect or bug removal and disposal device is provided which comprises a housing portion with the bottom thereof opened to the atmosphere. A panel portion is inserted and made part of the bottom area of the housing. The panel is positioned to move within such bottom portion. During insect removal, the panel is in the opened or partially opened position and the housing placed on top of the insect. The panel is then placed in the closed position, trapping the bug or insect within the housing. The bug is thus removed for ultimate disposal. Upon disposal, the panel is opened and the insect removed from the housing of the device.

5 Claims, 3 Drawing Sheets

INSECT REMOVAL AND DISPOSAL DEVICE

RELATED APPLICATION

This application is a continuation application based on co-pending application Ser. No. 07/551,802, filed Jul. 12, 1990, now abandoned; Inventor Kelly Eckard, entitled INSECT REMOVAL AND DISPOSAL DEVICE.

INTRODUCTION

The invention relates to a device for removing and disposing of insects and the like from undesired locations in a residence or other building occupied by humans. The invention relates to a method of removing insects from the floors or walls of a residence without the destruction and subsequent stain of such floor or wall by placement of the insect within the device of the invention and subsequent removal therefrom.

BACKGROUND OF THE INVENTION

Insects such as the common bug, ant, cockroach and fly are commonplace within all dwellings occupied by human beings. Such insects are generally removed from one's residence by destruction of such bug and subsequent disposal in the kitchen sink, in a toilet or trash can. Destruction of the bug is generally accomplished by one stepping on such bug or utilizing a book or other device for complete destruction of such insect.

Such destructive means generally disposes of the insect; however, in most if not all cases, such means leaves remains of the insect on the floor, carpeting, wallpaper or wall of the dwelling. Thereafter, one must clean such carpet, floor or wall area to remove the stain created thereby.

Accordingly, there is needed a device whereunder an insect may be removed from a dwelling area without destruction of such insect during the removal process.

One object of the invention is to provide a device for removal of undesirable insects. Another object of the invention is to provide a device for removal of insects without destruction of such insects during the removal process. A still further object of the invention is to provide a device for removal of an insect without the staining of the carpet, floor, wallpaper or wall area where the insect is located during the removal process. Other objects of the invention will be apparent from the following description.

BRIEF DESCRIPTION OF THE INVENTION

The device of the invention comprises a chamber having all areas enclosed except a bottom area. The bottom is left open. A sliding "scooper" panel member is placed within the bottom area of the chamber and slides within it utilizing grooves located near its bottom. The panel member has a "stopper" which is comprised of a simple vertical portion integral therewith and which prevents the panel from being completely removed from the bottom of the chamber.

In operation, the chamber is placed over the area where the insect is located with the bottom being opened to the atmosphere. The sliding scooper panel member is thereafter moved along the grooves of the chamber so as to completely enclose it. The insect is thus caught in the chamber upon full enclosure of the chamber by the sliding scooper panel member. The insect, located within the device of the invention, is thereafter removed to an area for disposal such as a kitchen sink, toilet, trash can, or to the outside of the dwelling. The panel member is slid open and the bug removed therefrom for ultimate disposal.

At no time is the insect "destroyed" during the removal process so as to cause any stain or damage to the residence or dwelling.

Additionally, the device may be utilized outside the dwelling for protection of exterior surfaces and for ease of insect collection. The principal use, however, is within the dwelling.

DETAILED DESCRIPTION OF THE INVENTION

Figure 1:
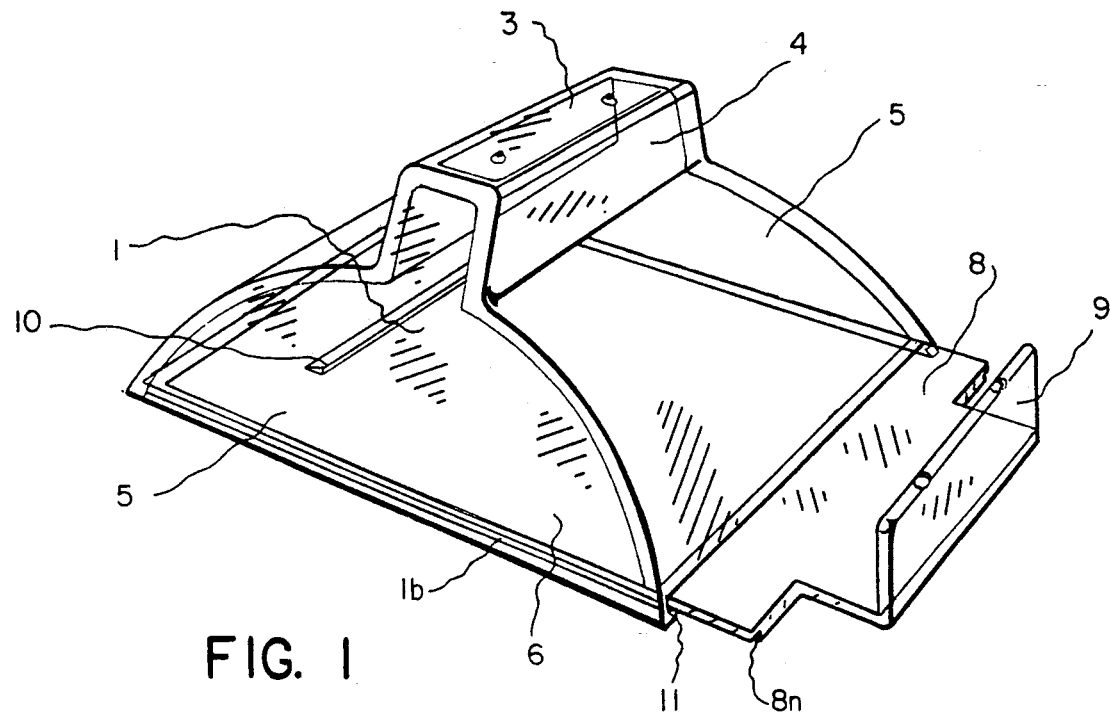
FIG. 1 is a perspective view of the device.

FIG. 1 is a perspective view of the insect removal device of the invention showing a chamber 1 enclosing an area 6 and having a base portion 1b with a lowermost planar surface 1p and an opening therethrough. In the example shown, there is an upper handle 3 to align the panel member 8 with the chamber 1 for insertion of the panel member thereinto.

Figure 2:
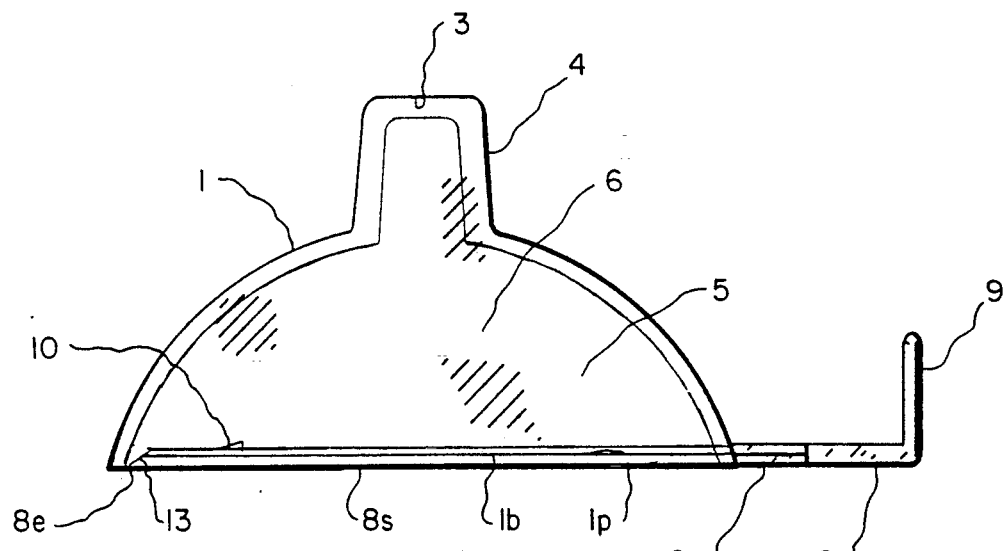
FIG. 2 is a left side elevation view.
Figure 5:
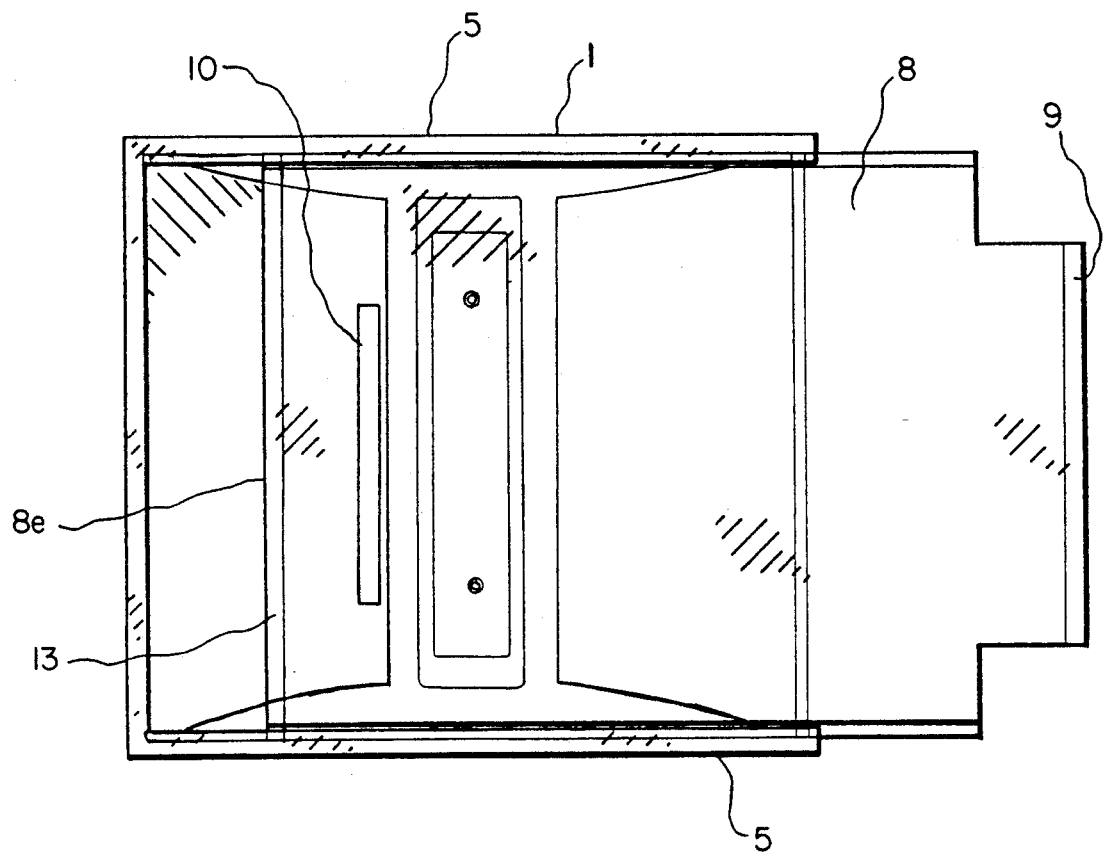
FIG. 5 is a plan view as seen from the bottom of the device with the sliding scooper panel in the partially opened condition.
Figure 6:
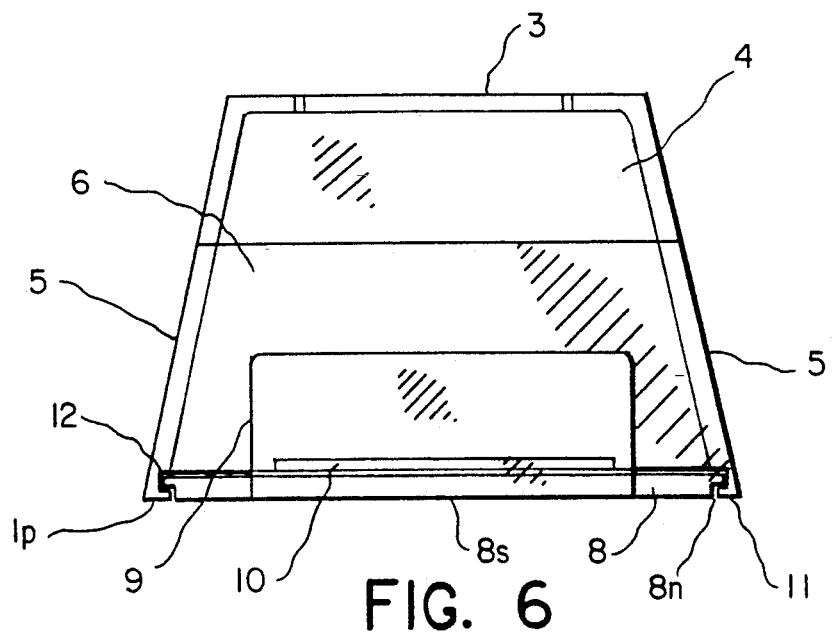
FIG. 6 is a front elevation view, the right side elevation view being a mirror image of FIG. 2, and the device being shaded to indicate transparency of all parts and portions thereof.

As best seen in FIGS. 2 and 5, panel member 8 has a foremost edge 8e which spans the opening in the chamber and terminates as a straight line coplanar with the lowermost surface of the base portion 1b. The interior end of the panel member 8 is generally tapered as shown in taper 13 to be bevelled upwardly and rearwardly its full length across the opening. This assists in the entrapment of the insect. Stop member 10 prevents withdrawal of the panel member 8.

FIG. 2 shows a left side elevation view with the panel member 8 being completely inserted within the chamber 1 defined by areas 3, 4 and 5 as discussed hereinabove. Panel member 8 has a bottom surface 8s coplanar with surface 1p. There is a handle 9 integral with panel member 8 for more convenient use of the panel member during the sliding operation. Obviously, handle 9, as well as the handles 3 and 4 of the housing, is not necessary for the proper operation of the invention and are convenience elements of the invention.

Figure 3:
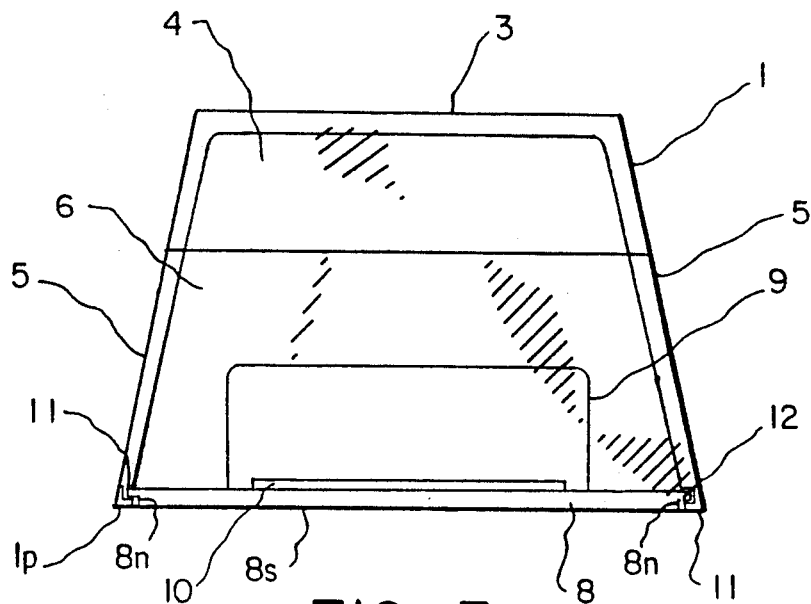
FIG. 3 is an elevation view as seen from the rear of the device.
Figure 4:
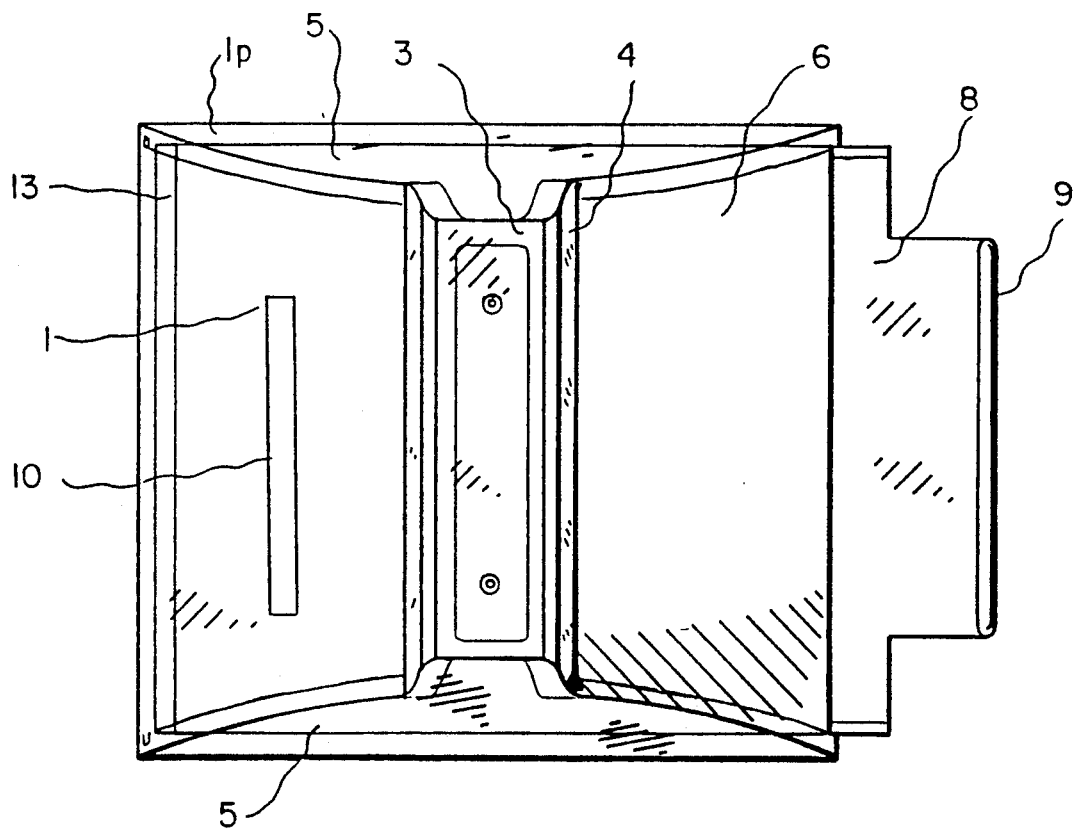
FIG. 4 is a plan view as seen from the top of the device.

FIG. 3 shows an elevation view from the rear of the invention. There is shown the grooved areas 11 of the sides 5 for insertion of panel member 8. Also, panel member 8 is shown with notches 8n leaving portion 12 for insertion into groove 11.

FIG. 5 shows a plan view from the bottom with the panel member in a partially opened position. Upon being partially opened, or even fully open, the insect can be located within the area 6 defined by the chamber 1 with sidewall portions 5 and panel member 8.

In operation, as discussed, the panel member 8 is simply moved forward and backward. When the panel 8 is in the opened or partially opened position, the device is placed on top of the insect. The panel member 8 is thereafter moved to the closed position. The tapered portion 13 of panel 8 assists in removing the insect. The insect is thus trapped within the area 6 defined by the chamber 1 and the panel 8. As described hereinabove, the device along with the insect therein, is thereafter located in a place for ultimate disposal of the bug, whether such place be the toilet, sink, trash can or outside of the dwelling.

When a bug is located on the carpet or floor, naturally the bottom portion and panel are in the horizontal position for trapping of the insect. When an insect is located on a wall, it is preferable that the scooper panel member 8 be located below the insect. During the removal or trapping process, the scooper panel member 8 is simply closed, as discussed, and the bug trapped within the chamber. After removal, the scooper panel is opened and the insect removed therefrom by simple shaking over the disposal area.

The device is illustrated as advantageously constructed completely of transparent material. However, only sufficient portions of the chamber 1, e.g. wall portion 5, need be transparent, to permit visual confirmation that the insect has been trapped.

I claim:

1. A portable device for removing and disposing of insects from a flat surface, comprising:
    a base portion having a lowermost planar surface for contacting a planar surface upon which the device is placed;
    a chamber disposed above the base portion to retain the insect, the base portion having a opening communicating with the chamber, so that the device can be placed over an insect with the base portion around the insect to capture it, said base portion having a periphery carrying groove means along opposite, parallel, sides proximate to the surface upon which the device is placed;
    a panel member slideably engaging the groove means to close the opening to trap the insect within the chamber, said panel member having an upper portion and a lowermost extension and being manually operable externally to the chamber; wherein
    the panel member has a foremost edge spanning the opening and terminating at its lowermost extension in a straight line co-planar with the lowermost surface of the base portion, so that no space exists between said foremost edge and the flat surface upon which the device is placed.

2. The portable device of claim 1, wherein the panel member comprises:
    a flat plate portion of constant thickness having a bottom and a top surface and a foremost edge and side edges, said side edges being notched to engage the groove means with said bottom surface co-planar with the lowermost planar surface of the base portion; and wherein
    the foremost edge of said flat plate portion is bevelled upwardly and rearwardly its full length from the bottom to the top surface thereof.

3. The portable device of claim 2, wherein the flat portion of the panel member further comprises:
    a projection upstanding from the top surface thereof rearwardly of the foremost edge thereof, preventing complete withdrawal of the panel member from the base portion.

4. The portable device of claim 3, wherein:
    at least a portion of at least one of the walls of the chamber is transparent.

5. The portable device of claim 1, wherein:
    at least a portion of at least one of the walls of the chamber is transparent.

* * * * *